United States Patent [19]
Noda et al.

[11] 3,804,520
[45] Apr. 16, 1974

[54] PHOTOMETRIC INDICATION CIRCUIT FOR BATTERY CHECKING

[75] Inventors: Nobuhiro Noda, Tokyo; Mitsuhiko Shimoda, Niiza, both of Japan

[73] Assignee: Asahi Kogaku Kogyo Kabushiki Kaisha, Tokyo-to, Japan

[22] Filed: June 28, 1972

[21] Appl. No.: 267,131

[30] Foreign Application Priority Data
July 20, 1971    Japan.............................. 46-63471

[52] U.S. Cl.................. 95/10 C, 352/141, 352/170
[51] Int. Cl. ........................................ G03b 17/18
[58] Field of Search .......... 95/10 C, 10 CE, 10 CT, 95/10 CD, 10 R; 352/141, 170, 171

[56] References Cited
UNITED STATES PATENTS
3,224,350   12/1965   Stimson............................ 95/10 C
3,200,720    8/1965   Drasch.............................. 95/10 C Primary Examiner—Samuel S. Matthews
Assistant Examiner—Russell E. Adams, Jr.
Attorney, Agent, or Firm—Christie, Parker & Hale

[57] ABSTRACT

Apparatus having a battery and a photometric indicating circuit, the latter including a meter for indication. A first switch uncouples the meter from the rest of the photometric indicating circuit for battery check purposes. A first serial circuit includes the meter and an impedance. A second serial circuit includes an impedance and a semiconductor element having a variable impedance versus voltage characteristic coupled in parallel circuit relation to the first serial circuit for shunting current around the meter. A second switching circuit selectively couples the battery across the first and second serial circuits, causing the meter to indicate the electrical output from the battery.

8 Claims, 2 Drawing Figures

PHOTOMETRIC INDICATION CIRCUIT FOR BATTERY CHECKING

BACKGROUND OF THE INVENTION

The present invention relates to a photometric indication circuit for checking a source battery, for an exposure time control circuit which is adapted to be incorporated into a photographic camera or the like.

Although there have already been proposed various battery checkers and some of them have actually been put to practical use, all of these battery checkers of prior art have separately employed many additional circuit elements to form a battery check circuit when used also as the photometric indication circuit and always required complicated operation of various switches in battery checking. It has been difficult with these battery checkers of prior art to obtain a battery checking function of high precision in view of their complicated construction and required troublesome operation.

SUMMARY OF THE INVENTION

The present invention overcomes the drawbacks in the aforementioned prior art photometric indication circuit with a battery checking function of higher precision that can be obtained through a simplified operation with an arrangement which is as uncomplicated as possible.

One embodiment of the present invention is characterized in that a semiconductor element having a variable impedance versus voltage characteristic is connected in series with a resistor and the resulting serial circuit is connected in parallel with another serial circuit consisting of a resistor including a variable resistance and an indication meter which forms part of the photometric indication circuit.

DESCRIPTION OF THE PREFERRED EMBODIMENT

Figure 1:
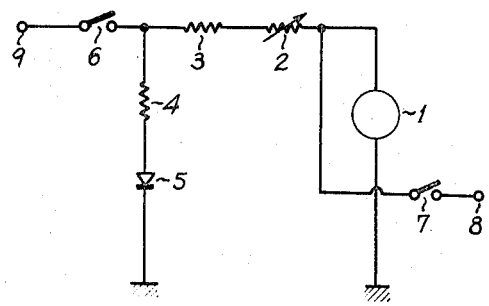
FIG. 1 is a circuit diagram illustrating an embodiment of the indication circuit having the battery checking function according to the present invention.

The present invention will now be described in more detail with respect to a preferred embodiment as illustrated by the accompanying drawings. As seen in FIG. 1, a series circuit is provided including a variable resistance 2, a fixed resistance 3 and a photometric indication meter 1 forming a part of (or which may be adapted to be incorporated into) a photometric circuit such as an exposure time control circuit in a photographic camera. The series circuit is connected in parallel between terminal 9 and ground with a power source provided in the form of a battery (not shown) through a switch 6 for battery check, as will be described more in detail later. A second series circuit includes a semiconductor element 5 such as a diode, which has an impedance which varies as a function of voltage, to which a resistor 4 is serially connected. The resistor 4 is connected to a point at which the resistor 3 is connected in series to the switch 6. Thus, the second series circuit is connected in parallel with the first series circuit. The relationship of resistors 3, 4 and the indication meter 1 together are as follows: $R_1 + R_2 \gg R_m$ where $R_m$ represents the value of internal resistance of the photometric indication meter 1, and $R_1$ and $R_2$ represent the resistance values of the variable resistance 2 and the fixed resistance 3, respectively, and $\gg$ symbolizes substantially greater than.

A photometric switch 7 has one terminal thereof connected to the point at which the indication meter 1 is serially connected to the variable resistance 2 and another terminal thereof connected to the output terminal 8 of a photometric circuit such as an exposure time control circuit in a photographic camera.

Figure 2:
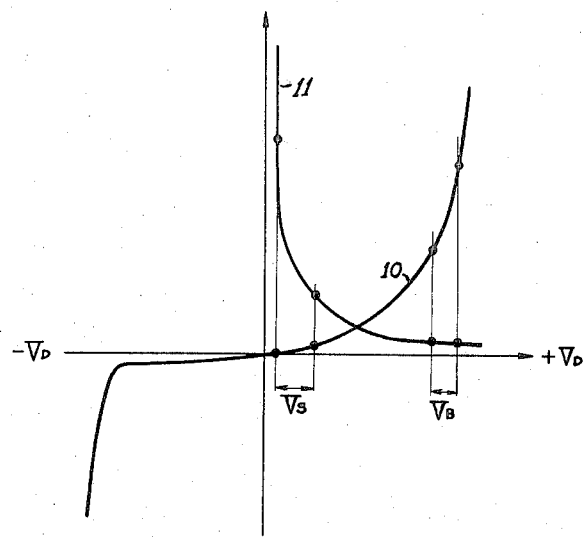
FIG. 2 shows the resistance and current characteristic occurring in the semiconductor element 5 depending upon the voltage $V_D$ being applied thereacross.

The manner in which the device according to the present invention operates will now be described in reference with the arrangement as aforementioned, making reference to FIG. 2. FIG. 2 shows characteristic curves 10 and 11, respectively, of electric current flowing through and internal resistance (along the ordinate) occurring in the semiconductor element 5 plotted according to variation of voltage $V_s$ (along the abscissa) applied through semiconductor element 5.

In operation, first the switch 6 is opened while the photometric switch 7 is closed by means not shown, in order that the indication meter 1 may indicate a photometric value such as light intensity of an object to be photographed. In this state of light measuring, a voltage, lower than that of the source battery, is applied to the indication circuit and the semiconductor element 5 so that the semiconductor element 5 assumes a relatively high internal resistance value corresponding to the range of the internal resistance characterizing curve 11 within which voltage $V_S$ is applied to the semiconductor element 5. The amount of electric current flowing through the semiconductor element 5 in this state of light measuring (i.e., within the range of the current flow characterizing curve 10 within which voltage $V_S$ is applied to the semiconductor element 5 as seen in FIG. 2), is sufficiently small to prevent any influential error from being involved in photometric indication such as exposure time indication by the indication meter 1.

Operation of checking the source battery voltage is initiated by opening the switch 7 while closing the switch 6. In this state of battery check, the source voltage is directly applied between the terminal 9 and ground and the semiconductor element 5. The semiconductor 5 transfers to the state of low impedance as shown by the curve 10 in FIG. 2, within the range of appropriate operating voltage $V_B$. Thus the resistances 2 and 3 both of high resistance values form together with semiconductor element 5 a load circuit for the indication meter 1, and the output voltage of the semiconductor element 5 causes the indication meter 1 to indicate the source voltage of the battery or the like with a higher degree of precision.

It should be noted here that the variable resistance 2 is a temperature sensitive resistor which serves to regulate sensitivity of the indication meter 1 and cooperates with the fixed resistance 3 so that it compensates for the variation of the internal resistance of the indication meter 1 caused by temperature variation.

According to the present invention, it will be readily understood from the aforegoing description, not only indication of exposure time but also source voltage check of a battery or the like can be automatically accomplished with a high precision under regulation based on voltage applied to the semiconductor element 5 by the device of extremely simplified arrangement which is useful with photographic cameras having therein an exposure time control circuit as well as the electric exposure meter or the like to check the operating voltage of such a meter.

What is claimed is:

1. A combined battery loading and checking circuit and photometric indicating circuit, utilizing a common meter for indication, the improvement comprising:
   a first series circuit comprising said meter and an impedance serially connected together;
   first switching means for coupling and uncoupling the meter from the rest of the photometric indicating circuit for photometric indication and battery check, respectively;
   a second series circuit comprising an impedance and a semiconductor element serially connected together, said second series circuit being connected in parallel across said first series circuit for shunting current around said first series circuit; and
   second switching means for coupling a battery simultaneously across both said first and second series circuits, for causing said meter to indicate the level of voltage output from the battery,
   said semiconductor element being characterized by a first high internal impedance responsive to a first low voltage level formed across said meter by the rest of the coupled photometric indicating circuit thereby causing said meter to provide a photometric indication, said semiconductor element being characterized by a second substantially lower internal impedance causing current to be shunted around said first series circuit and thereby load a coupled battery responsive to a second substantially higher voltage level formed thereacross by such a coupled battery, the remaining current through the meter providing a battery indication.

2. Apparatus according to claim 1 wherein said first series circuit comprises a temperature sensitive impedance to compensate for temperature variations in said meter.

3. Apparatus according to claim 1 wherein the value of said impedance in said first series circuit is substantially greater than the value of the impedance in said meter.

4. Apparatus according to claim 1 wherein the impedances in said first and second series circuit comprises resistors.

5. Apparatus according to claim 4 wherein the resistance in said first and second series circuit comprises first and second resistors, said second resistor being temperature sensitive to compensate for variation in said meter with change in temperature.

6. A combined battery checker and a photometric indicating circuit, the latter including a meter coupled thereto for photometric indication, the improvement comprising:
   a first series circuit comprising said meter and a first impedance;
   a second series circuit comprising a second impedance and a semiconductor element, the second serial circuit being coupled in parallel across said first series circuit for selectively shunting current around said first series circuit; and
   means for coupling a battery across the parallel connection of said first and second series circuits,
   said semiconductor element being characterized by a first high internal impedance responsive to a first low voltage level formed across said meter by the rest of the coupled photometric indicating circuit thereby causing said meter to provide a photometric indication, said semiconductor element being characterized by a second substantially lower internal impedance causing current to be shunted around said first series circuit and thereby load a coupled battery responsive to a second substantially higher voltage level formed thereacross by such a coupled battery, the remaining current through the meter providing a battery indication.

7. The combination of claim 6 wherein said impedance in said first circuit comprises a temperature sensitive resistor and a further resistor connected in series circuit relation.

8. The combination of claim 7 comprising first switching means for uncoupling the meter from the rest of the photometric indicating circuit for battery check purposes.

* * * * *

UNITED STATES PATENT OFFICE
CERTIFICATE OF CORRECTION

Patent No. 3,804,520  Dated April 16, 1974

Inventor(s) Nobuhiro Noda and Mitsuhiko Shimoda

It is certified that error appears in the above-identified patent and that said Letters Patent are hereby corrected as shown below:

Col. 4, line 18, "serial" should read --series--.

Signed and sealed this 1st day of October 1974.

(SEAL)
Attest:

McCOY M. GIBSON JR.
Attesting Officer

C. MARSHALL DANN
Commissioner of Patents